(12) United States Patent
Van Vliet et al.

(10) Patent No.: US 9,187,347 B2
(45) Date of Patent: *Nov. 17, 2015

(54) TREATMENT OF A WASTE STREAM THROUGH PRODUCTION AND UTILIZATION OF OXYHYDROGEN GAS

(75) Inventors: David Ritchie Van Vliet, Calgary, CA (US); Hector Alvarez-Vazquez, Caledon, CA (US)

(73) Assignee: XOGEN TECHNOLOGIES INC., Orangeville (CA)

( * ) Notice: Subject to any disclaimer, the term of this patent is extended or adjusted under 35 U.S.C. 154(b) by 232 days.

This patent is subject to a terminal disclaimer.

(21) Appl. No.: 12/905,350

(22) Filed: Oct. 15, 2010

(65) Prior Publication Data

US 2011/0084031 A1    Apr. 14, 2011

Related U.S. Application Data

(63) Continuation-in-part of application No. 11/565,240, filed on Nov. 30, 2006, now Pat. No. 7,837,882, which is a continuation-in-part of application No. 10/717,951, filed on Nov. 19, 2003, now Pat. No. 7,160,472.

(60) Provisional application No. 60/427,921, filed on Nov. 19, 2002.

(51) Int. Cl.
  *C02F 1/46* (2006.01)
  *C02F 1/465* (2006.01)
  (Continued)

(52) U.S. Cl.
  CPC .............. *C02F 1/465* (2013.01); *C02F 1/4672* (2013.01); *C02F 1/4676* (2013.01); *C02F 1/20* (2013.01);
  (Continued)

(58) Field of Classification Search
  CPC ...... C02F 1/465; C02F 1/4672; C02F 11/006; C02F 11/12; C02F 2001/46133; C02F 2101/322; C02F 2103/343; C02F 2201/46125; C02F 2201/4617; C02F 2201/46175; C02F 2201/782; C02F 1/20; C02F 1/4676; C02F 2001/46171; C02F 2101/105; C02F 2101/16; C02F 2101/305; C02F 2103/008; C02F 2103/06; C02F 2103/20; C02F 2103/28; C02F 2103/365; C02F 2201/003; C02F 2301/08; C02F 2303/04; C02F 2303/24
  USPC ............... 210/707, 748.01, 748.17, 776, 192, 210/252, 259; 204/194, 554, 571, 660; 205/633, 637
  See application file for complete search history.

(56) References Cited

U.S. PATENT DOCUMENTS

| | | |
|---|---|---|
| 2,882,210 A | 4/1959 | Jenks |
| 3,262,869 A | 7/1966 | Belasco et al. |

(Continued)

FOREIGN PATENT DOCUMENTS

| | | |
|---|---|---|
| CA | 1084868 | 9/1980 |
| CA | 2381681 | 10/2002 |

(Continued)

OTHER PUBLICATIONS

Mexican Patent Office, Office Action dated Oct. 13, 2010, MX Application No. 2009/005627, Jardines del Pedregal Mexico.

(Continued)

*Primary Examiner* — Fred Prince
(74) *Attorney, Agent, or Firm* — Borden Ladner Gervais LLP; David Nauman

(57) ABSTRACT

Methods and systems for reducing a redox active contaminant in a waste stream in a waste treatment system involve performing a unit process of the waste treatment system by contacting redox active contaminant in the waste stream with oxyhydrogen-rich gas generated on-site by an oxyhydrogen gas generator that implements water dissociation technology. The oxyhydrogen gas generator involves applying a pulsed electrical signal to a series of closely spaced electrodes that are submerged in the waste stream to produce oxyhydrogen-rich gas from a water component of the waste stream. Operation of the oxyhydrogen gas generator in the waste stream may accomplish one or more unit processes for waste treatment, such as oxidation, stripping, floatation, disinfection, conditioning, stabilization, thickening, and dewatering, among others.

10 Claims, 8 Drawing Sheets

(51) Int. Cl.
*C02F 1/467* (2006.01)
*C02F 11/00* (2006.01)
*C02F 11/12* (2006.01)
*C02F 1/461* (2006.01)
*C02F 101/32* (2006.01)
*C02F 103/34* (2006.01)
*C02F 1/20* (2006.01)
*C02F 101/10* (2006.01)
*C02F 101/16* (2006.01)
*C02F 101/30* (2006.01)
*C02F 103/00* (2006.01)
*C02F 103/06* (2006.01)
*C02F 103/20* (2006.01)
*C02F 103/28* (2006.01)
*C02F 103/36* (2006.01)

(52) U.S. Cl.
CPC ............... C02F 11/006 (2013.01); C02F 11/12 (2013.01); C02F 2001/46133 (2013.01); C02F 2001/46171 (2013.01); C02F 2101/105 (2013.01); C02F 2101/16 (2013.01); C02F 2101/305 (2013.01); C02F 2101/322 (2013.01); C02F 2103/001 (2013.01); C02F 2103/008 (2013.01); C02F 2103/06 (2013.01); C02F 2103/20 (2013.01); C02F 2103/28 (2013.01); C02F 2103/343 (2013.01); C02F 2103/365 (2013.01); C02F 2201/003 (2013.01); C02F 2201/4617 (2013.01); C02F 2201/46125 (2013.01); C02F 2201/46175 (2013.01); C02F 2201/782 (2013.01); C02F 2301/08 (2013.10); C02F 2303/04 (2013.01); C02F 2303/24 (2013.01)

(56) References Cited

U.S. PATENT DOCUMENTS

| | | |
|---|---|---|
| 3,311,097 A | 3/1967 | Mittelstaedt |
| 3,330,771 A | 7/1967 | Komatsu et al. |
| 3,505,188 A | 4/1970 | Pan |
| 3,523,891 A | 8/1970 | Mehl |
| 3,562,137 A | 2/1971 | Gehring |
| 3,829,368 A | 8/1974 | Wesley |
| 3,844,942 A | 10/1974 | Barber |
| 3,944,478 A * | 3/1976 | Kuji et al. ................ 210/192 |
| 3,959,131 A | 5/1976 | Ramirez et al. |
| 3,969,203 A | 7/1976 | Ramirez |
| 3,980,053 A | 9/1976 | Horvath |
| 3,981,789 A | 9/1976 | Harrison et al. |
| 3,989,608 A | 11/1976 | Demonbrun et al. |
| 4,009,104 A | 2/1977 | Behrendt et al. |
| 4,014,777 A | 3/1977 | Brown |
| 4,036,726 A | 7/1977 | Gale et al. |
| 4,062,754 A | 12/1977 | Eibl |
| 4,101,409 A | 7/1978 | Austin |
| 4,140,609 A | 2/1979 | Zuker |
| 4,169,029 A | 9/1979 | Smirnov et al. |
| 4,179,347 A | 12/1979 | Krause et al. |
| 4,184,931 A | 1/1980 | Inoue |
| 4,206,031 A | 6/1980 | King |
| 4,384,943 A | 5/1983 | Stoner et al. |
| 4,439,290 A | 3/1984 | Marfurt et al. |
| 4,457,816 A | 7/1984 | Galluzzo et al. |
| 4,506,631 A | 3/1985 | Phong-Anant |
| 4,717,450 A | 1/1988 | Shaw et al. |
| 4,747,925 A | 5/1988 | Hasebe et al. |
| 4,755,305 A | 7/1988 | Fremont et al. |
| 4,772,369 A | 9/1988 | Mercier et al. |
| 4,795,537 A | 1/1989 | Timewell |
| 4,908,109 A | 3/1990 | Wright |
| 4,919,775 A | 4/1990 | Ishigaki |
| 4,956,057 A | 9/1990 | Stucki et al. |
| 5,091,152 A | 2/1992 | Thomas, Sr. |
| 5,108,563 A | 4/1992 | Cook |
| 5,256,263 A | 10/1993 | Kanai |
| 5,304,289 A | 4/1994 | Hayakawa |
| 5,324,398 A | 6/1994 | Erickson et al. |
| 5,338,421 A | 8/1994 | Abe et al. |
| 5,376,242 A | 12/1994 | Hayakawa |
| 5,399,247 A | 3/1995 | Carey et al. |
| 5,435,894 A | 7/1995 | Hayakawa |
| 5,439,567 A | 8/1995 | Cook |
| 5,460,702 A | 10/1995 | Birkbeck et al. |
| 5,549,800 A | 8/1996 | Iwata |
| 5,549,812 A | 8/1996 | Witt |
| 5,599,437 A | 2/1997 | Taylor et al. |
| 5,611,907 A | 3/1997 | Herbst et al. |
| 5,614,078 A | 3/1997 | Lubin et al. |
| 5,632,870 A | 5/1997 | Kucherov |
| 5,695,650 A | 12/1997 | Held |
| 5,698,107 A | 12/1997 | Wurzburger et al. |
| 5,725,751 A | 3/1998 | Robert |
| 5,851,404 A | 12/1998 | Christy et al. |
| 5,928,490 A | 7/1999 | Sweeney |
| 5,935,392 A | 8/1999 | Lubin et al. |
| 5,935,412 A | 8/1999 | Brainard, II |
| 5,958,213 A | 9/1999 | Goto |
| 6,113,779 A | 9/2000 | Snee |
| 6,126,794 A | 10/2000 | Chambers |
| 6,126,838 A | 10/2000 | Huang et al. |
| 6,139,710 A | 10/2000 | Powell |
| 6,179,977 B1 | 1/2001 | Herbst |
| 6,179,991 B1 | 1/2001 | Norris et al. |
| 6,180,014 B1 | 1/2001 | Salama |
| 6,238,546 B1 | 5/2001 | Knieper et al. |
| 6,241,861 B1 | 6/2001 | Herbst |
| 6,294,061 B1 | 9/2001 | Morkovsky et al. |
| 6,306,280 B1 | 10/2001 | Reipa et al. |
| 6,315,886 B1 | 11/2001 | Zappi et al. |
| 6,328,875 B1 | 12/2001 | Zappi et al. |
| 6,346,197 B1 | 2/2002 | Stephenson et al. |
| 6,391,184 B1 | 5/2002 | Orolin et al. |
| 6,419,815 B1 | 7/2002 | Chambers |
| 6,482,327 B1 | 11/2002 | Mori et al. |
| 6,488,835 B1 | 12/2002 | Powell |
| 6,521,133 B1 | 2/2003 | Roediger |
| 6,547,951 B1 | 4/2003 | Maekawa |
| 6,576,096 B1 | 6/2003 | Andrews et al. |
| 6,613,202 B2 | 9/2003 | Herbst et al. |
| 6,613,217 B1 | 9/2003 | Gilmore |
| 6,638,413 B1 | 10/2003 | Weinberg et al. |
| 7,563,939 B2 | 7/2009 | Denton |
| 7,795,332 B2 | 9/2010 | Hintzer et al. |
| 2001/0004063 A1 | 6/2001 | Oh |
| 2002/0036175 A1 | 3/2002 | Held et al. |
| 2002/0076370 A1 | 6/2002 | Wong et al. |
| 2002/0179453 A1 | 12/2002 | Chambers |
| 2004/0028590 A1 | 2/2004 | Tsjui et al. |
| 2004/0084326 A1 | 5/2004 | Weinberg et al. |
| 2004/0099599 A1 | 5/2004 | Van Vliet et al. |
| 2004/0108203 A1 | 6/2004 | Sullivan |
| 2005/0230321 A1 | 10/2005 | Berrak et al. |
| 2006/0175200 A1 | 8/2006 | Holland |
| 2008/0006584 A1 | 1/2008 | Van Vliet et al. |
| 2009/0071844 A1 | 3/2009 | Gomez |
| 2011/0215001 A1 | 9/2011 | Gadgil et al. |
| 2013/0341267 A1 | 12/2013 | Prasad et al. |

FOREIGN PATENT DOCUMENTS

| | | |
|---|---|---|
| CN | 1329576 | 1/2002 |
| EP | 0748984 | 12/1996 |
| EP | 0748984 A1 | 12/1996 |
| JP | 06-47382 | 2/1994 |
| JP | 06-343970 | 12/1994 |
| JP | 07-51676 | 2/1995 |
| JP | 09-014631 | 1/1997 |
| JP | 09-71886 | 3/1997 |
| JP | 9248581 A | 9/1997 |
| JP | 2002-531704 | 12/1999 |
| JP | 2000-039123 | 2/2000 |

(56) References Cited

FOREIGN PATENT DOCUMENTS

| JP | 2000-102777 | 4/2000 |
|---|---|---|
| JP | 2000-135488 | 5/2000 |
| JP | 2000-279995 | 10/2000 |
| JP | 2000-320816 | 11/2000 |
| JP | 2001-149998 | 6/2001 |
| JP | 2001-179299 | 7/2001 |
| JP | 2001-276830 | 10/2001 |
| JP | 2002-155387 | 5/2002 |
| JP | 2002-250792 | 9/2002 |
| JP | 2006506221 A | 2/2006 |
| WO | 00/00670 A1 | 1/2000 |
| WO | 00/34184 | 6/2000 |
| WO | 2004/046042 | 6/2003 |
| WO | 2008064460 A1 | 6/2008 |

OTHER PUBLICATIONS

Korean Intellectual Property Office, Office Action dated Nov. 22, 2010, Korean patent application No. 10-2005-7008970, Seoul, Korea.
Mexican Patent Office, Office Action dated Jun. 14, 2011, MX Application No. 2009/005627, Jardines del Pedregal Mexico.
European Patent Office, Extended European Search Report dated Apr. 26, 2011, European patent application No. 07845507.8, Rijswijk, Netherlands.
Brazilian Patent and Trademark Office, Report of Technical Examination dated Dec. 9, 2010, Brazilian Patent Application No. 0316432-2, Rio de Janeiro, Brazil.
English translation of Chinese Patent Application No. 200780050477.9, Office Action dated Mar. 21, 2012.
Zappi Water Purification Systems, Patents & PublicationsZappi Water Purification Systems, "Patents & Publications," visited Nov. 6, 2003, http://www.zappisystems.com/patents.htm, 1 page., visited Nov. 6, 2003, http://www.zappisystems.com/patents.htm.
Donald Mills, "A New Process for Electrocoagulation," Journal AWWA, Plant Operation, Jun. 2000, pp. 34-43, vol. 92, Issue 6.
Battele, "Battelle and D-H20 Demonstrate a Novel Pulsed Electric Field Technology to Substantially Reduce Biosolids," News Release, http://www.battelle.org/news/02/04-19-02, Biosolids.stm, 2 pgs, Apr. 19, 2002.
PCT International Patent Office, International Search Report dated Apr. 20, 2004, PCT Application No. CA2003/001780.
International Searching Authority, Invitation to Pay Additional Fees dated Apr. 27, 2004, PCT Application No. CA2003/01780.
PCT International Patent Office, Written Opinion dated Nov. 10, 2004, PCT application No. CA2003/001780.
PCT International Patent Office, International Search Report dated Feb. 28, 2008, PCT Application No. CA2007/002037.
European Patent Office, Summons to Attend Oral Proceedings pursuant to Rule 115(1) EPC dated Feb. 5, 2009, European application No. 06114853.2, Munich, Germany.
Japanese Patent Office, Notice of Grounds of Rejection dated Aug. 6, 2009, Japanese application No. 552315/2004, Japan.
Japanese Patent Office, Final Decision for Rejection dated Apr. 6, 2010, Japanese application No. 552315/2004, Japan.
Chilean Patent Office, Examiner's Resolution dated , 2011, Chilean Patent Application No. 1190-05, Santiago de Chile, Chile.
PCT International Patent Application No. PCT/CA2011/050642, PCT International Search Report dated Jan. 17, 2012.
Japanese Patent Application No. 2009-538557, Japanese Office Action dated Jan. 10, 2012.
PCT International Application No. PCT/CA2012/050838, International Search Report dated Feb. 7, 2013.
First Office Action issued on May 6, 2014 against Chinese Patent Application No. 201180060719.9, along with English translation.
International Search Report and Written Opinion issued Jul. 9, 2014 for International Application No. PCT/CA2014/050367.
Non-final Office Action dated Dec. 18, 2014 from corresponding U.S. Appl. No. 13/725,074, with Notice of References Cited.
Second Office Action issued on Dec. 15, 2014 for corresponding Chinese Application No. 201180060719.9, with English translation.
First Examination Report issued on Oct. 27, 2014 for corresponding Indian Patent Application No. 3530/DELNP/2009.
Extended European Search Report and Opinion dated May 7, 2015 for corresponding European Patent Application No. 11831894.8.
The State Intellectual Property Office of the People's Republic of China, Notification of First Office Action dated Apr. 25, 2011, Chinese Patent Application No. 200780050477.9, Beijing City, China.

\* cited by examiner

TREATMENT OF A WASTE STREAM THROUGH PRODUCTION AND UTILIZATION OF OXYHYDROGEN GAS

CROSS-REFERENCE TO RELATED APPLICATIONS

This application is a continuation-in-part of U.S. patent application Ser. No. 11/565,240 filed Nov. 30, 2006, which is a continuation-in-part of U.S. patent application Ser. No. 10/717,951 filed Nov. 19, 2003, now U.S. Pat. No. 7,160,472, which claims the benefit of priority of U.S. provisional patent application Ser. No. 60/427,921 filed Nov. 19, 2002. All of the above applications are hereby incorporated herein by reference in their entirety.

FIELD

This application relates to methods and systems for treating waste streams, such as industrial waste water, municipal waste water and others.

BACKGROUND

Harmful materials found in many waste streams can present a significant risk to the environment and/or human health if left untreated. Government regulations often mandate that various organic, inorganic, chemical, and microbial components of a waste stream must be treated before the waste stream can be discharged to the environment. Examples of such waste streams include industrial and municipal wastewater, chemical processing effluent, animal waste, paper mill effluent, and others.

FIG. 1 presents a schematic of a treatment facility illustrative of prior art systems for treating municipal wastewater. With reference to FIG. 1, wastewater influent 100 enters a primary clarifier 102 of the wastewater treatment facility where raw sludge 104 is separated from the wastewater via flocculation, sedimentation, and other primary settling techniques. The wastewater from the primary clarifier 102 is then transported to an aeration basin 106, in which aerobic microorganisms 108 help treat the wastewater in the presence of air 110 that is pumped into the aeration basin 106. The wastewater is then transferred to a secondary clarifier 112, in which further settling can occur. Secondary sludge 114 is also collected in the secondary clarifier, and the treated wastewater 116 is transported to an effluent body of water or other distribution source (sometimes only after being subjected to certain advanced treatment procedures such as disinfection, for example).

Some of the secondary sludge 114 is recycled 118 back into the aeration basin 106 to help perpetuate the aerobic biodegradation process. The remaining secondary sludge 114 from the secondary clarifier 112 and the raw sludge 104 from the primary clarifier 102 are transported via a digester feed 120 to an anaerobic digester 122. In the anaerobic digester 122, anaerobic microorganisms 124 further degrade the sludge and yield by-product gases 126, such as methane 128. The digested sludge from the anaerobic digester 122 is transferred off as liquid 130 which can be applied directly to agricultural land or can be sent to a dewatering process 132. From the dewatering process, the centrate or liquid fraction 134 is typically returned to the front end of the treatment plant 100 for treatment, and the dewatered sludge cake 136 can be used for incineration, land application, or other appropriate uses.

Biosolids are a mixture of water and very small solid particles (primarily bacteria and protozoa). The particles carry a net negative charge that resists flocculation, i.e., the agglomeration of smaller particles into larger composite particles. In order to produce a matrix that has sufficient porosity to allow the movement of water through the matrix and accomplish dewatering, an organic polyelectrolyte or polymer is typically added to biosolids as a conditioning aid. In simple terms, these polymers are essentially long organic strands or ribbons with many active sites that have a net positive charge. The polymer neutralizes the negative charge on the biosolids and binds a particle to each active site on the polymer. The polymers have a tendency to stick to each other with the net effect that larger particles are created and the result is a porous matrix through which water can drain during the dewatering process.

Traditional polymer conditioning has a number of problems associated with it. Polymers are expensive and can account for a significant portion of the operating cost of a biosolids processing budget. The characteristics of biosolids change on a continual basis and it is difficult to provide the exact amount of polymer required at any given time to ensure that adequate performance is achieved without overdosing and wasting the polymer. The polymers normally used for conditioning biosolids are high molecular weight, high charge density materials, which are resistant to biological degradation and are known to be toxic to aquatic organisms. There is concern that any overdose of polymer could result in a release of the excess into the environment with toxic effects on fish and other aquatic species. The breakdown of polymers in stored biosolids has also been associated with the production of significant odors.

Waste streams may also be treated by incineration. Incineration is one of the few technologies that offers a technically sound solution for the complete destruction of pathogens, viruses, and toxic organics. In addition, it has the capability to process biosolids that contain high levels of contaminants, and which are, therefore, unacceptable for agricultural utilization. However, the high capital cost of a conventional incinerator and the extensive pre-processing (e.g., dewatering) of the biosolids make the process very expensive. Thus, incineration has typically been economical only in very large wastewater treatment facilities, in which it is possible to benefit from economy of scale.

In order to avoid the consumption of prohibitively expensive quantities of imported energy during the combustion process of prior art incineration systems, the biosolids must be dewatered to a cake with approximately 30% solids. At this level of dryness, the cake is a plastic, sticky, semi-solid material that can present significant operational problems related to the transfer of the cake from the dewatering device to the incinerator. Variations in the solids content of the cake and attendant variations in heat demand can also make the combustion process very difficult to control.

Stabilization of biosolids is a mandatory prerequisite for agricultural utilization of waste sludge and, depending upon the specific location, may be regulated by federal, state, or provincial authorities. The regulations protect human health and the environment from potential risks associated with pathogens contained in the biosolids. Regulatory bodies typically stipulate which treatment processes are acceptable and/or what levels of specific pathogens are allowable in the treated product. Conventionally, stabilization occurs through one or more of the following processes: biological degradation of organic matter, elevated pH, reduction of moisture, and waste handling according to specific time/temperature regimes. All of these processes are relatively expensive, and may be energy intensive, require large volumes of admixtures, or be difficult to control.

The electricity needed to operate conventional wastewater treatment facilities has traditionally been purchased from a distribution grid. There has been little incentive to generate electricity on site because power from the grid has been cheap and secure, the capital cost for generating equipment is high, and the only cheap source of fuel for power production is digester gas. However, there are a number of problems with utilizing digester gas as an energy source. Although it contains a high percentage of methane, digester gas is also saturated with water and contains significant quantities of hydrogen sulfide. This makes digester gas extremely corrosive, and extensive cleaning is required prior to its use. Furthermore, digester gas is only the byproduct of a waste treatment process, as opposed to being a production process in itself. The amount of gas produced is a function of the biosolids stabilization process and cannot be modified to meet changing demands. The combustion of methane-rich biogas also generates significant greenhouse gas emissions.

After most solids have been separated from influent wastewater, the remaining effluent is typically disinfected in preparation for its release into the environment. The disinfection of wastewater effluent has been historically accomplished through the addition of chlorine compounds. There are major health and safety concerns associated with handling chlorine compounds. In recent years, there have been increased concerns that chlorine can combine with organic material in the effluent to produce chlorinated organics, which are both toxic and potentially carcinogenic. Although some efforts are being made to substitute less toxic chlorine compounds, there is an industry-wide trend towards phasing out the use of chlorine as a disinfectant agent.

Other disinfection technologies employed in wastewater treatment involve the use of ultra-violet (UV) light or ozone to destroy the pathogens. Neither of these processes leaves any appreciable residual in the treated effluent to impact on the environment. However, the capital and operating costs of both of these systems are relatively high. In the case of a UV process, the capital costs include the construction of the flow-through mechanism, and the multiple UV bulbs (lamps) that are required. The operating costs include power, the replacement of bulbs, and regular cleaning of the bulbs. The major costs for disinfecting with ozone include the ozone generator and the commercial oxygen, which is used as the feed source. When air is used as the feed source, the size of the ozone generator must be approximately doubled, therefore doubling the capital cost.

More recently, additional attention has been placed on the presence of organic, inorganic and chemical components such as pharmaceutical products, petrochemical products, personal care products and metals. Personal care products can include, for example, prescription and over-the-counter therapeutic drugs, veterinary drugs, fragrances and cosmetics. The removal of these components from a waste stream has become more and more important.

Many of the uses for water in a waste treatment facility require relatively high quality water that is free of suspended particulate matter, but there is no need for it to be chlorinated or to have a chlorine residual present, as is the case for potable water. Final effluent does not meet these criteria due to the presence of suspended solids. It is therefore unsuitable as an alternative for applications such as making up polymer, because the suspended solids generate a polymer demand in the makeup water itself Currently, waste treatment plants have no alternative for these higher quality end uses other than the use of potable water, which they must purchase from the municipal water supply system.

There is thus a need for improved methods and systems for flocculation, incineration, dewatering, energy efficiency, stabilization, effluent disinfection, chemical removal and production of high quality process water in a wastewater treatment plant and for treating other kinds of waste streams. The methods and systems provided herein are intended to also remove pharmaceuticals, personal care products and petrochemical products from the waste water.

SUMMARY

Methods and systems for reducing a redox active contaminant in a waste stream in a waste treatment system involve performing a unit process of the waste treatment system by contacting the redox active contaminant in the waste stream with oxyhydrogen-rich gas generated by an oxyhydrogen gas generator that implements water dissociation technology. In one embodiment, the oxyhydrogen gas generator applies a pulsed electrical signal to a series of closely-spaced electrodes that are submerged in the waste stream to produce oxyhydrogen-rich gas from a water component of the waste stream. Operation of the oxyhydrogen gas generator in the waste stream may accomplish one or more unit processes for waste treatment, such as conditioning, stabilization, thickening, and dewatering, among others.

At least a portion of the oxyhydrogen-rich gas can be conveyed for a second use in the waste treatment system, such as a source of combustible fuel for incineration or power generation, for example. Oxygen may also be separated from the oxyhydrogen-rich gas for use in aeration basin of the waste treatment system or to supply an ozone generator that may be utilized in the disinfection of effluent of the waste treatment system. Exhaust from the combustion of the oxyhydrogen-rich gas can be condensed to recover water for various uses within the treatment system.

According to one aspect herein, there is provided a method for removing a redox active contaminant from a waste stream, comprising: submersing two closely spaced electrodes in the waste stream, the waste stream comprising a water component and the redox active contaminant, the electrodes bordering an interaction zone extending therebetween; applying a pulsed electrical signal to at least one of the electrodes thereby generating oxyhydrogen-rich gas from the water component, the oxyhydrogen-rich gas forming bubbles in the interaction zone that rise to a surface of the waste stream, wherein at least some of the bubbles contact the redox active contaminant as they rise through the waste stream thereby transporting at least a portion of the redox active contaminant to the surface of the waste stream.

In a particular case, the two closely spaced electrodes may be steel electrodes and the method may further include: submersing two closely spaced aluminum electrodes in the waste stream downstream of the steel electrodes, the aluminum electrodes bordering a second interaction zone extending therebetween; and applying a pulsed electrical signal to at least one of the aluminum electrodes thereby generating oxyhydrogen-rich gas from the water component, the oxyhydrogen-rich gas forming bubbles in the second interaction zone that rise to a surface of the waste stream.

According to another aspect herein, there is provided a system for removing a redox active contaminant from a waste stream, the waste stream including a water component, the system comprising: two closely spaced electrodes to be submersed in the waste stream, the electrodes defining an interaction zone extending therebetween; a power supply for applying a pulsed electrical signal to at least one of the electrodes to generate from the water component oxyhydrogen-rich gas which will form bubbles in the interaction zone that rise to a surface of the waste stream; a reaction vessel to contain the bubbles as they rise; a gas containment lid to trap above the waste stream a mixture of the oxyhydrogen-rich gas and the redox active contaminant of the waste stream, the mixture formed by those of the bubbles that contact a portion of the redox active contaminant that transport the portion to the surface of the waste stream; and transport system for transporting the mixture to further treatment.

In a particular case, the two closely spaced electrodes may be steel electrodes and the system may further include: two closely spaced aluminum electrodes to be submersed in the waste stream downstream of the steel electrodes, the electrodes defining a second interaction zone extending therebetween, and wherein the power supply applies a pulsed electrical signal to at least one of the aluminum electrodes to generate from the water component oxyhydrogen-rich gas which will form bubbles in the second interaction zone that rise to a surface of the waste stream. It will be understood that the aluminum electrodes may be in a separate area from the steel electrodes and that the residence time for each set of electrodes may be different and may depend on various factors related to the waste stream. Further, the pulsed electrical signal may be provided by a single or multiple sources and may be the same or different for each set of electrodes.

In the above cases, the redox active contaminant may be a pharmaceutical or, more generally, a personal care product. The pharmaceutical may be benzafibrate, carbamazepine, fluozetine, sulfamethoxazole, trimethoprim, ibuprofen, naproxen or diclofenac. In another particular case, the redox active contaminant may be caffeine or the like.

Additional aspects and advantages will be apparent from the following detailed description of embodiments, which proceeds with reference to the accompanying drawings.

DETAILED DESCRIPTION

Throughout the specification, reference to "one embodiment", "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment.

Furthermore, the described features, structures, characteristics, and methods may be combined in any suitable manner in one or more embodiments. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

As noted above, there is an increased interest in the removal of chemical components such as pharmaceutical products, petrochemical products, personal care products and metals from waste water streams. While previously unanticipated, it has now been demonstrated that there are additional benefits to the treatment of an influent waste stream with oxyhydrogen-rich gas. In addition to the reduction of ammonia, phosphorous, suspended solids, pathogens and organic material (measured as Biochemical Oxygen Demand, or BOD) in the waste stream, it has now been shown that treatment of a waste stream with oxyhydrogen-rich gas can also reduce the concentration of redox-active organic contaminants (such as pharmaceutical, personal care products and petrochemical products). In addition, refinements of the process of treatment with oxyhydrogen-rich gas have shown an improved reduction or removal of redox-active organic contaminants.

Figure 2:
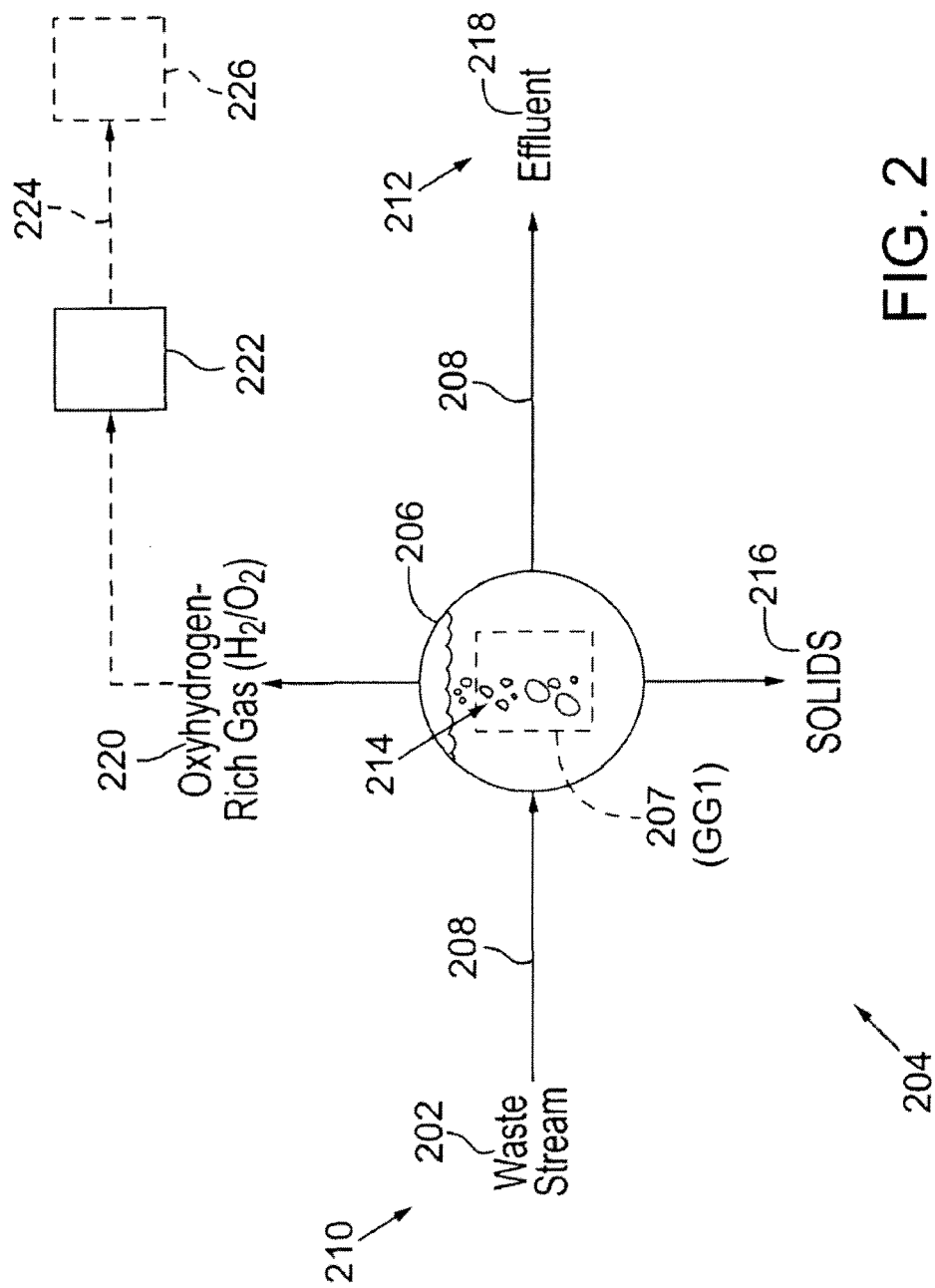
FIG. 2 is a schematic diagram illustrating treatment of a waste stream via a waste treatment system in accordance with an embodiment herein.

FIG. 2 is a schematic diagram illustrating treatment of a waste stream 202 via a simplified waste treatment system 204 in accordance with a first embodiment. With reference to FIG. 2, waste stream 202 may comprise an influent waste stream, such as industrial or municipal wastewater (raw sewage which may include pharmaceutical, personal care products and petrochemical products), for example. Alternatively, waste stream 202 may comprise an intermediate waste stream such as supernatant or biosolids, for example, in the context of a larger waste treatment process. In still other embodiments, waste stream 202 may include chemical processing effluent, animal waste, paper mill effluent, landfill leachate, marine wastewater, storm water runoff, groundwater, surface water, in-situ treatment process effluent, and environmental contaminate remediation process effluent, for example. Waste stream 202 may be subjected to preliminary processing steps, such as screening and grit removal, before undergoing a unit process 206, as described below. Screening and grit removal may be particularly important when waste stream 202 comprises raw sewage influent.

In one embodiment, unit process 206 comprises an oxyhydrogen gas generator 207 (001) interposed in a flow path 208 between an inlet 210 and an outlet 212 of waste treatment system 204 for generating oxyhydrogen-rich gas 214 from a water component of waste stream 202. Oxyhydrogen-rich gas 214 generated from waste stream 202 preferably bubbles through or otherwise passes through at least a section of flow path 208 to thereby contact at least a portion of waste stream 202. In some embodiments, the water component is segregated from the waste stream 207 through use of a semipermeable membrane or other separation technology and the gas generator 207 is immersed in the segregated water component. In other embodiments, oxyhydrogen-rich gas may be generated external to flow path 208 and added at unit process 206 to contact at least a portion of waste stream 202. For example, a source of water for the oxyhydrogen gas generator 207 may include tap water, surface water, or a water component that has been separated from the waste stream.

Unit process 206 may operate as a one-step wastewater treatment process, in which the concentrations of contaminants, examples of which are: Biochemical Oxygen Demand (BOD), ammonia, phosphorous, suspended solids and pathogens are reduced in waste stream 202. Unit process 206 may additionally operate as a wastewater treatment process in which the concentration of organic, inorganic and chemical contaminants, such as pharmaceutical, personal care products, petrochemical products, and metals, are reduced in waste stream 202. The contaminants to be removed from waste stream 202 using the produced oxyhydrogen-rich gas 214 are generally considered as: (a) contaminants which can be oxidized though contact with the oxidants contained in the oxyhydrogen-rich gas 214 (i.e. they are "oxidizable contaminants"), and (b) contaminants which can be reduced through contact with the hydrogen contained in the oxyhydrogen-rich gas 214 (i.e. they are "reducible contaminants"). That is to say, the contaminants to be removed from waste stream 202 using the produced oxyhydrogen-rich gas 214 can be called reduction-oxidation ("redox") active ("redox active contaminants") under the conditions of the process 206. Contaminants are removed from waste stream 202 via operation of the gas generation apparatus in flow path 208. For example, where waste stream 202 comprises municipal wastewater, organic contaminants, such as pharmaceutical, personal care products and petrochemical products, are believed to be oxidized by the oxidizing compounds contained in the oxyhydrogen-rich gas 214.

Volatile contaminants, which evaporate to varying degrees at normal wastewater processing temperatures, such as ammonia (inorganic) and acetone, toluene, dichloromethane and dichlorobenzene (organic) are stripped (transferred from the liquid phase to the gas phase) from the wastewater through the upward flow of oxyhydrogen-rich gas 214 produced by oxyhydrogen gas generator 207 (GG1). Solid-phase contaminants such as suspended solids and phosphorous are removed through the natural flotation mechanism created by oxyhydrogen-rich gas 214 which is produced in the form of microbubbles from the oxyhydrogen gas generator 207 (GG1). The stripped volatile contaminants are collected at the surface of the unit process 206 in combination with the oxyhydrogen-rich gas 214 and are conveyed to a secondary process module 222 where they may be combusted with the oxyhydrogen-rich gas 220 or separated from the oxyhydrogen-rich gas by processes such as membranes for further treatment (not shown). The solid fraction 216 can be removed from the liquid stream either directly, by skimming the float layer from unit process 206 or by subsequent sedimentation. In this embodiment as a one-step wastewater treatment process, biological processes are not intended as a component of unit process 206 and therefore the production of biosolids is not intended to occur. The solid fraction in this embodiment is not intended to be biosolids but rather consists of inert, inorganic solids 216 that can be directly disposed of in landfill without further treatment. The treated waste stream is concurrently disinfected of pathogens so that it meets regulatory and industry standards for effluent 218. Thereafter effluent 218 may be released directly to a body of surface water such as a river, for example, or reused in waste treatment system 204. In alternative embodiments, effluent 218 may undergo further processing (not shown) such as tertiary sand filtration after unit process 206 and before release or reuse.

Figure 4:
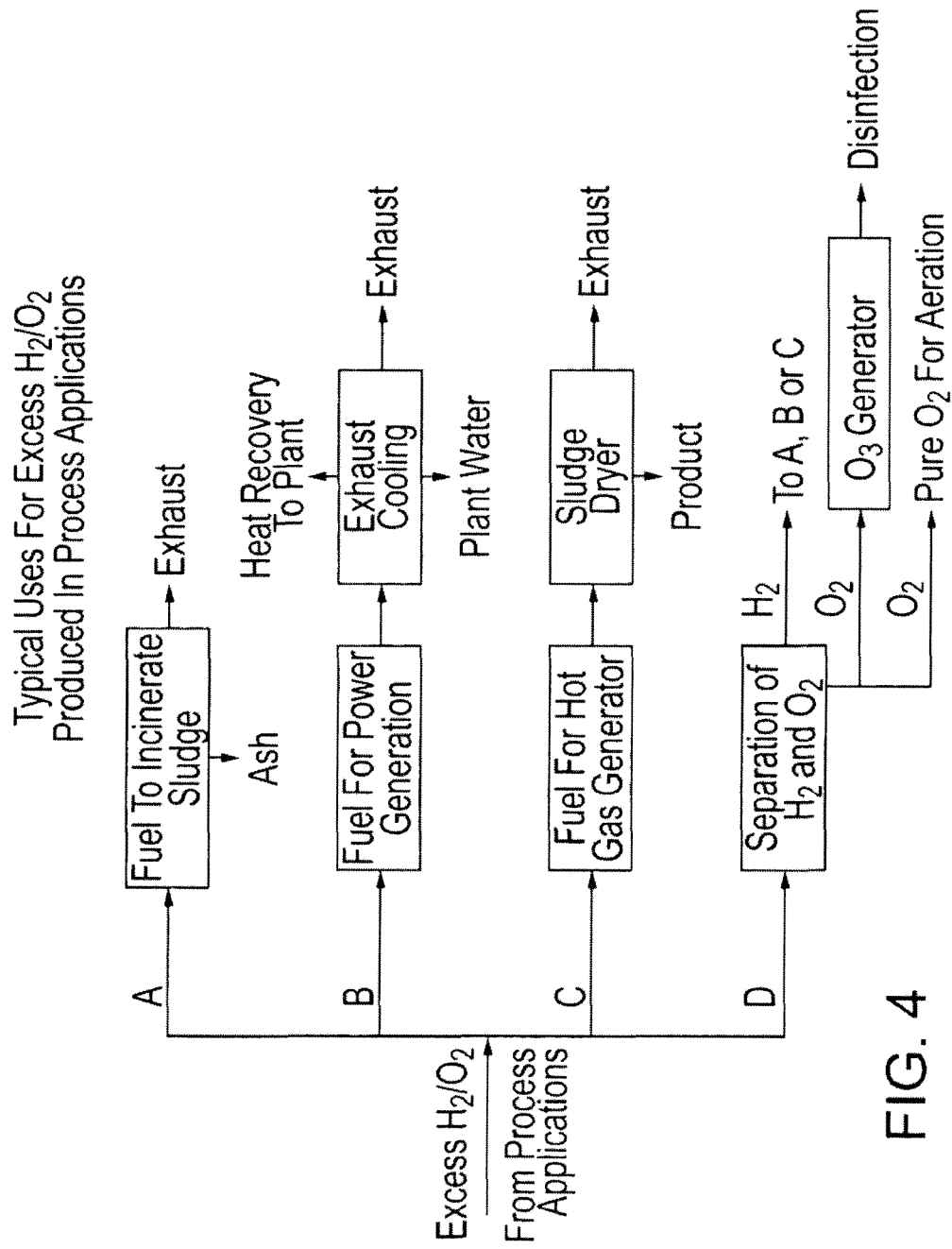
FIG. 4 is a schematic diagram illustrating typical secondary uses for oxyhydrogen-rich gas produced by one or more unit processes employing an oxyhydrogen gas generation apparatus according to FIGS. 2, 3A, 3B, 3C, and 5.

After contacting waste stream 202, exiting amounts of oxyhydrogen-rich gas 220 may be conveyed from unit process 206 to a secondary process module 222 of waste treatment system 204, such as an incineration unit, for example. FIG. 4, described below, illustrates various other secondary uses for oxyhydrogen-rich gas 220 following its utilization in unit process 206. Depending on the kind of secondary use for which oxyhydrogen-rich gas 220 is employed, unused oxyhydrogen-rich gas or a by-product 224 of secondary process 222, may be recovered or otherwise conveyed to one or more other process modules 226 for use in tertiary aspect(s) of waste treatment system 204 or external use(s).

Oxyhydrogen gas generator 207 may implement a water dissociation technology, such as the kind disclosed in U.S. Pat. Nos. 6,419,815 and 6,126,794 of Chambers, both issued to Xogen Technologies Inc. and incorporated herein by reference (hereinafter "the Xogen patents"). As described in the Xogen patents at columns 3-5, gas generation apparatuses in accordance with embodiments include electrode "cells" each including two or more spaced-apart electrodes adapted to be immersed in a working fluid including water. In the embodiments described herein, the working fluid comprises waste stream 202. The electrodes are preferably made of the same material. One electrode material is stainless steel for its low cost and durability, but it may be possible to use other conductive metals. An equal spacing between the electrodes is maintained and it is preferable to minimize the spacing between the electrodes. However, the spacing between the electrodes cannot be positioned excessively close because arcing between the electrodes would occur. It has been determined that a spacing of 1 mm or less is optimal spacing for producing oxyhydrogen-rich gas, but an increased spacing of up to approximately 5 mm may work effectively while being less subject to fouling due to accumulation of solids between the electrodes. A spacing above 5 mm may also be feasible, but tends to reduce the output of oxyhydrogen gas and increases power requirements.

It is preferable to include many pairs of electrodes (e.g. dozens or hundreds) within each cell. The electrodes can be almost any shape, but preferably comprise flat plates closely spaced and parallel to each other. Alternative embodiments may include coaxially aligned cylinders. Insulating spacers can be interposed between adjacent electrodes to maintain equal spacing between the electrodes and to prevent current leakage therebetween.

As further described in the Xogen patents, a high-frequency pulsed direct current (DC) electrical signal is applied to the electrodes. The pulsed signal can be almost any waveform and have a variable current level, voltage level, frequency and mark-space ratio (i.e., a ratio of the duration of a single pulse to the interval between two successive pulses). The source of power for the power supply may include a mains 110 volts or batteries, such as 12-volt car batteries. For example, the power supply may comprise two 12-volt batteries arranged in series to provide a 24-volt supply. For powering a large-scale gas generator GG1 in a large waste treatment system such as a municipal wastewater treatment plant, a more complex power supply may be required for generating 24-volt pulsed DC signal having sufficient power to drive the large cells required. Alternatively, multiple smaller electrode cells may be provided for redundancy and spaced apart in a reaction vessel or other reaction zone, in which case the cells may be driven by simpler independent power supplies.

A controller is used in conjunction with the batteries or other power source to generate one of a variety of pulsed output waveforms, such as a square wave, a saw tooth wave, or a triangular wave, which can be applied to the electrodes. At present, the best results for producing oxyhydrogen-rich gas have been obtained using a square wave. In one embodiment a pulsed signal has a mark-space ratio of between approximately 1:1 and 10:1 and a pulse frequency of approximately 10 Hz-250 kHz.

After initiation of the pulsed signal from the power supply, the electrodes continuously and almost instantaneously generate bubbles of oxyhydrogen-rich gas from water molecules in an interaction zone that extends between the electrodes and slightly beyond the edges of the electrodes. The generated bubbles are not bunched around or on the electrodes and thus readily float to the surface of the fluid in the reactor vessel or other reaction zone. Therefore, there is no need to add a chemical catalyst to assist the conduction of the solution or inhibit bubbles from bunching around or on the electrodes. Thus, many different kinds of waste streams can be used as the working fluid, as can other sources of water, such as surface water and ordinary tap water.

Figure 3:
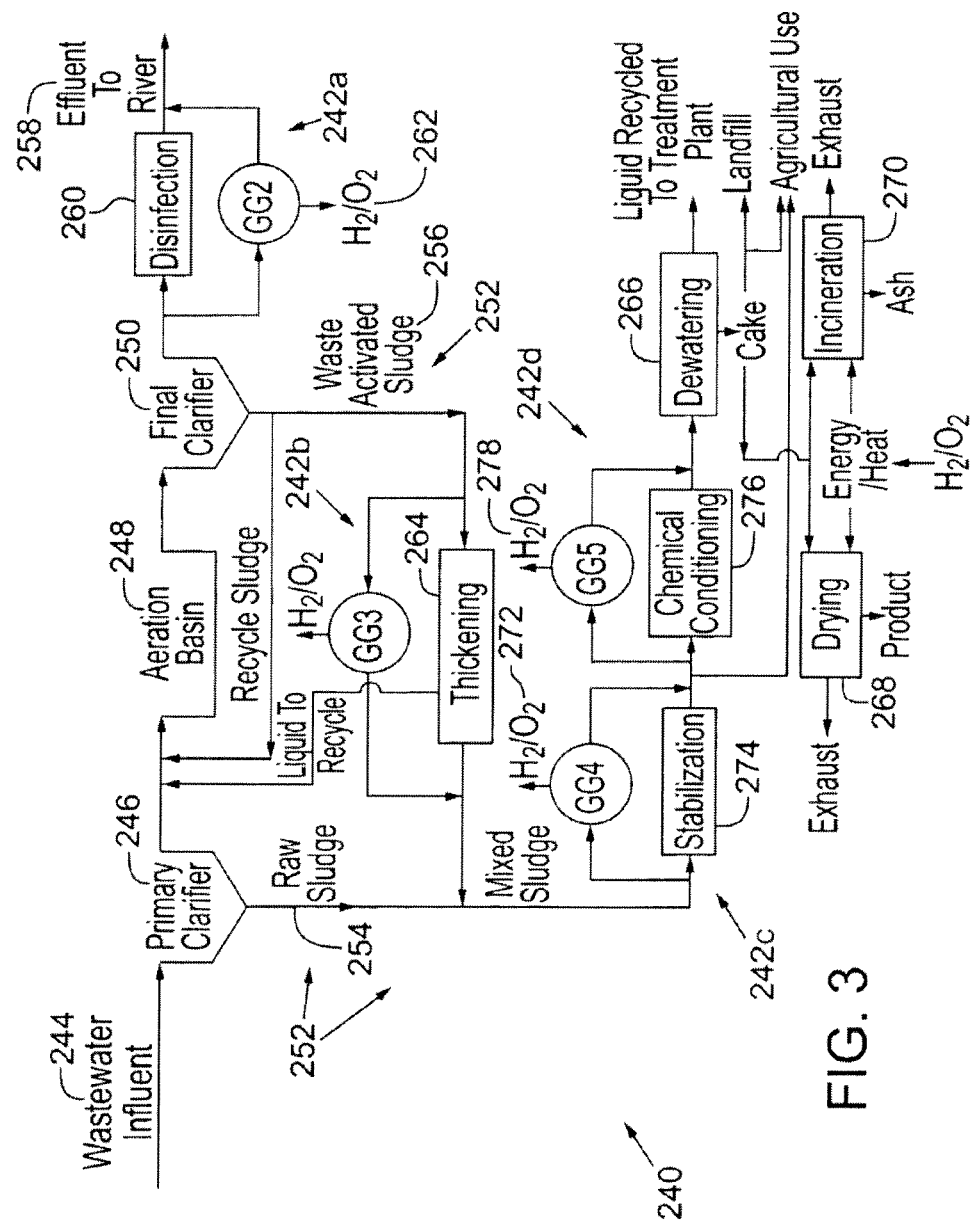
FIG. 3 is a schematic diagram illustrating a waste treatment system in accordance with embodiments in which oxyhydrogen gas generation apparatuses may be used to perform one or more unit processes in a waste treatment system.

FIG. 3 is a schematic diagram illustrating a waste treatment system 240 in which oxyhydrogen gas generators GG2, GG3, GG4, and GG5 may be used in the performance of one or more unit processes 242a, 242b, 242c, and 242d (collectively unit processes 242) of waste treatment system 240. Oxyhydrogen gas generators GG2, GG3, GG4, and GG5 may comprise devices similar to those described herein (items 207 and 500) with reference to FIGS. 2 and 5, for example. With reference to FIG. 3, waste treatment system 240 is embodied as a wastewater treatment plant for treating a waste stream 244 comprising municipal wastewater (raw sewage, which may include pharmaceutical, personal care products and petrochemical products). However, consistent with various other embodiments, waste treatment systems may, alternatively, be arranged and configured to treat different types of waste streams, such as industrial wastewater, chemical processing effluent, animal waste, paper mill effluent, landfill leachate, marine wastewater, storm water runoff, ground water, surface water, in-situ treatment process effluent, and environmental contaminate remediation process effluent, for example. Wastewater influent may be treated by use of a primary clarifier 246, aeration basin 248 and final clarifier 250 in accordance with known methods, in which biosolids 252 are removed from waste stream 244 in the forms of raw sludge 254 and waste activated sludge 256.

Before treated wastewater can be released as effluent 258, it must typically be disinfected to prevent pathogens from entering the receiving water where they could present a health risk. As described above, conventional disinfection processes utilize ultra-violet (UV) radiation, chlorine, or ozone. In accordance with one embodiment, a disinfection process 260 is either replaced or supplemented by an oxyhydrogen gas generator GG2 interposed in the flow path of the treated waste stream, between final clarifier 250 and effluent outlet 258. The pulsed electrical signal applied to oxyhydrogen gas generator GG2 operates to generate oxyhydrogen-rich gas and, by its operation, disinfects treated wastewater. Excess oxyhydrogen-rich gas ($H_2/O_2$) 262 can then be conveyed to a secondary use within waste treatment system 240, as described below with reference to FIG. 4. Alternatively, an oxygen component of oxyhydrogen-rich gases ($H_2/O_2$) produced by one or more unit processes 242 other than disinfection unit process 242a can be conveyed to disinfection unit 260 as a feed source for an ozone generator of disinfection process 260, which may result in substantial overall cost savings for effluent disinfection. Typically, the oxygen component would need to be separated from the oxyhydrogen-rich gas ($H_2/O_2$) before use as a feed source for an ozone generator. One possible technology for separating the oxygen component from the oxyhydrogen-rich gas is known as pressure swing adsorption ("PSA"), a version of which is available in gas separation equipment sold by QuestAir Technologies Inc. of Burnaby, British Columbia, Canada. Other technologies and devices may also be used for separating the oxygen component from the oxyhydrogen-rich gas.

In FIG. 3 and elsewhere in this specification, the notation "$H_2/O_2$" is used to symbolize oxyhydrogen-rich gas, without limiting to clean oxyhydrogen gas or to a pure gaseous mixture of diatomic hydrogen ($H_2$) and diatomic oxygen ($O_2$). Oxyhydrogen-rich gas is typically composed of gas mixture including predominantly hydrogen and oxygen, but may include at least some oxygen and hydrogen in forms other than diatomic oxygen ($O_2$) and diatomic hydrogen ($H_2$), such as hydroxide radicals, for example. Oxyhydrogen-rich gas may further include measurable amounts of components other than hydrogen and oxygen that may result, for example, from the operation of the oxyhydrogen gas generator in the presence of high concentrations of contaminants or from reactions of the generated oxyhydrogen gas with contaminants in the waste streams. For example, small amounts (e.g., 1% to 4% mole fraction) of carbon dioxide ($CO_2$) gas may often be present in oxyhydrogen-rich gas generated from wastewater or tap water. Trace amounts of nitrogen may also be present in oxyhydrogen-rich gas, particularly when generated from wastewater, and may indicate breakdown of the nitrogenous compounds present in the wastewater. Furthermore, oxygen and hydrogen generated in accordance with the embodiment gas generators GG2-GG5 are typically generated in a stoichiometric ratio of approximately 1:2, respectively, notwithstanding the lack of an indication of the stoichiometric ratio or other gas components in the shorthand notation "$H_2/O_2$" used herein.

In advance of a stabilization unit process 242c, biosolids 252 in the form of waste activated sludge 256 may undergo a thickening unit process 242b. In accordance with one embodiment, a conventional thickening process 264 such as gravity belt filtering, centrifuging, or dissolved air floatation (DAF), for example, is supplemented or replaced by an oxyhydrogen gas generator GG3. Oxyhydrogen gas generator GG3 is preferably interposed in the flow of waste activated sludge between final clarifier 250 and a downstream biosolids treatment process such as stabilization 242c, conditioning 242d, dewatering 266, drying 268 and/or incineration 270, for example. The operation of oxyhydrogen gas generator GG3 preferably causes floatation of biosolids and other suspended solids (i.e. collection of solids at the surface of the waste stream), which results in a concentrated floating layer that can be easily removed or separated from the waste stream for further treatment.

In one embodiment, oxyhydrogen gas generator GG3 is submerged in wastewater contained in a reaction vessel and operated for an interval of from approximately 60 seconds to up to approximately 10 minutes, then power to the gas generator GG3 is shut off. It has been found that after an interval of operation of gas generator GG3, a substantial amount of solids collects on the surface of the wastewater. While a modest amount of solids may collect on the surface of the wastewater during operation of gas generator GG3, a surprisingly large increase in floating solids occurs nearly immediately after de-energizing of gas generator GG3 and stopping of a recycle flow through the reaction vessel (see the description of FIG. 5, below, for details of the recycle flow provided by pump 526). De-energizing of gas generator GG3 and stopping of the recycle flow results in quiescent conditions within the reaction vessel, which allow for unhindered floatation of solids. Preliminary experiments showed that after operating gas generator GG3 for an interval of approximately 5 minutes, then de-energizing for a period of approximately 2 minutes, without recycle flow, the solids concentration in a floating layer was 4.82% as compared to 0.54% in the feed material (i.e., prior to operation of gas generator GG3). This represents a removal of 93.5% of the sludge particles from the original feed material. It should be noted that this separation efficiency, which is generally comparable to conventional technology, was accomplished without the addition of any flocculation agents such as organic polymers. The floatation effect of the gas generator is sometimes referred to as "extracted gas floatation." An extracted gas floatation unit process includes one or more cycles each including the following steps: (1) operating the gas generator GG3 (typically by applying a high-frequency pulsed electrical signal) for between approximately 60 seconds and approximately 10 minutes, (2) de-energizing gas generator GG3, (3) waiting until solids collect on the surface of the fluid (typically between approximately 30 seconds and 2 minutes), and (4) removing the solids from the surface (by skimming the surface, for example). The cycles can be repeated continually until a desired amount of solids has been removed from the wastewater.

Biosolids 252 that are to be applied to agricultural land must typically be stabilized 242c prior to application to reduce the number and viability of pathogens. Stabilization is conventionally accomplished aerobically (by oxidation) or anaerobically (by conversion of organic material to methane in the absence of oxygen). Both approaches are expensive with aerobic stabilization being energy intensive and anaerobic stabilization being capital intensive. In accordance with one embodiment, an oxyhydrogen gas generator GG4 is utilized for stabilization of the biosolids 252 in waste stream and generation of oxyhydrogen-rich gas ($H_2/O_2$) 272. Gas generator GG4 may be submerged in a reaction vessel 502 (FIG. 3B) wherein the waste stream comes into direct contact with the oxyhydrogen-rich gas 272 produced by gas generator GG4. Utilization of an oxyhydrogen gas generator GG4 for stabilization may require a shorter time of residence than required in a conventional stabilization processes 274 to kill or render innocuous an effective amount of pathogens. Consequently, gas generator GG4 can be immersed directly in a continuous reactor for treating biosolids as they flow through a processing zone of the reactor. The size of the gas generator GG4 and the residence time required in the processing zone (i.e. the length of the flow path through the continuous reactor) is a function of the level of stabilization required to meet regulatory requirements. For example, if the objective is to produce a "Class A" biosolids product meeting standards set forth in United States Environmental Protection Agency ("U.S. EPA") Regulation 503, the finished product must typically have a density of fecal coliform in the biosolids of less than 1000 most probable numbers (MPN) per gram total solids and a "vector attraction reduction" such as a 38 percent reduction in volatile solids content. Two of the approved conventional ways to achieve this are to treat the biosolids by thermophillic aerobic digestion at a temperature of 55° C. to 60° C. for a period of 10 days (240 hours) or under an alternative time/temperature regime of 50° C. for a period of 5 days (120 hours). By contrast, experimental studies utilizing an oxyhydrogen gas generator GG4 have shown that the stabilization and vector attraction reduction criteria can be met with a processing temperature of 25° C. and a batch residence time of 4 to 6 hours.

Operation of oxyhydrogen gas generator GG4 is believed to create, within a reaction vessel or flow-through processing zone, an atmosphere that is consistent with the conditions required for stabilization. As oxyhydrogen-rich gas is liberated, the temperature of the contents of the reactor or processing zone increases and can be controlled to achieve necessary temperature requirements for stabilization, in view of a known residence time of a particular system. The time/temperature regime can be customized to meet regulatory requirements and provide the necessary pathogen destruction. The residence time of the liquid can also be controlled independently of the temperature, with the result that any combination of time and temperature can be achieved. Following stabilization, the biosolids can either be dewatered for agricultural utilization or utilized directly in a liquid injection program. The oxygen liberated by the gas generator GG4 produces a highly oxidative environment resulting in the oxidation of organic matter, which can, in itself, satisfy stabilization requirements. The combination of these two stabilization approaches in one step offers the potential for an extremely efficient process. The combination of these conditions may be sufficient to qualify as a "Process to Further Reduce Pathogens" as specified in U.S. EPA Regulation 503 and may produce Class A bio solids that can be applied, in liquid form, directly to agricultural land. Treated material may generate fewer odors and attract fewer vectors, such as flies and rodents, during the subsequent handling and reuse operations. When these advantages are coupled with the output of energy stored in the form of the liberated oxyhydrogen-rich gas 272, it is expected that the overall cost of the stabilization unit process 242c will be significantly lower than for conventional stabilization processes.

In some embodiments, a separate conditioning step 242d is performed after stabilization 242c (either conventional 274 or via gas generator GG4) and before dewatering 266. Conventional chemical conditioning 276 involves the addition of polymers or organic polyelectrolytes to facilitate flocculation of solid particles for removal from the waste stream. Conditioning consistent with one embodiment utilizes an oxyhydrogen gas generator GG5 to supplement or replace chemical conditioning 276. Gas generator GG5 generates a highly oxidative and elevated temperature regime that tends to destroy polysaccharide layers around biosolids, which can present a barrier to flocculation of the biosolids. The reduction in polysaccharide alters surface properties of the biosolids to thereby decrease the amount of polymer required or, in some cases, to completely eliminate the need for polymer additives. Thus, implementation of the oxyhydrogen gas generator in the conditioning unit process 242d reduces the cost of conditioning, reduces problems of toxicity and odor generation, and concurrently liberates oxyhydrogen-rich gas ($H_2/O_2$) 278 from a water component of the biosolids waste stream 252. The oxyhydrogen-rich gas 278 can then be recovered and conveyed for secondary uses within waste treatment system 240 or elsewhere. Similarly to stabilization 242c, the gas generator GG5 of conditioning process 242d may be immersed in a reaction vessel 502 (FIG. 3A) or placed in a reaction zone of a conduit or other flow path through which the waste stream flows. Moreover, the utilization of an oxyhydrogen gas generator may allow both stabilization and conditioning to be performed concurrently in a single combined stabilization/conditioning unit process, as discussed below with reference to FIG. 3B.

Figure 1:
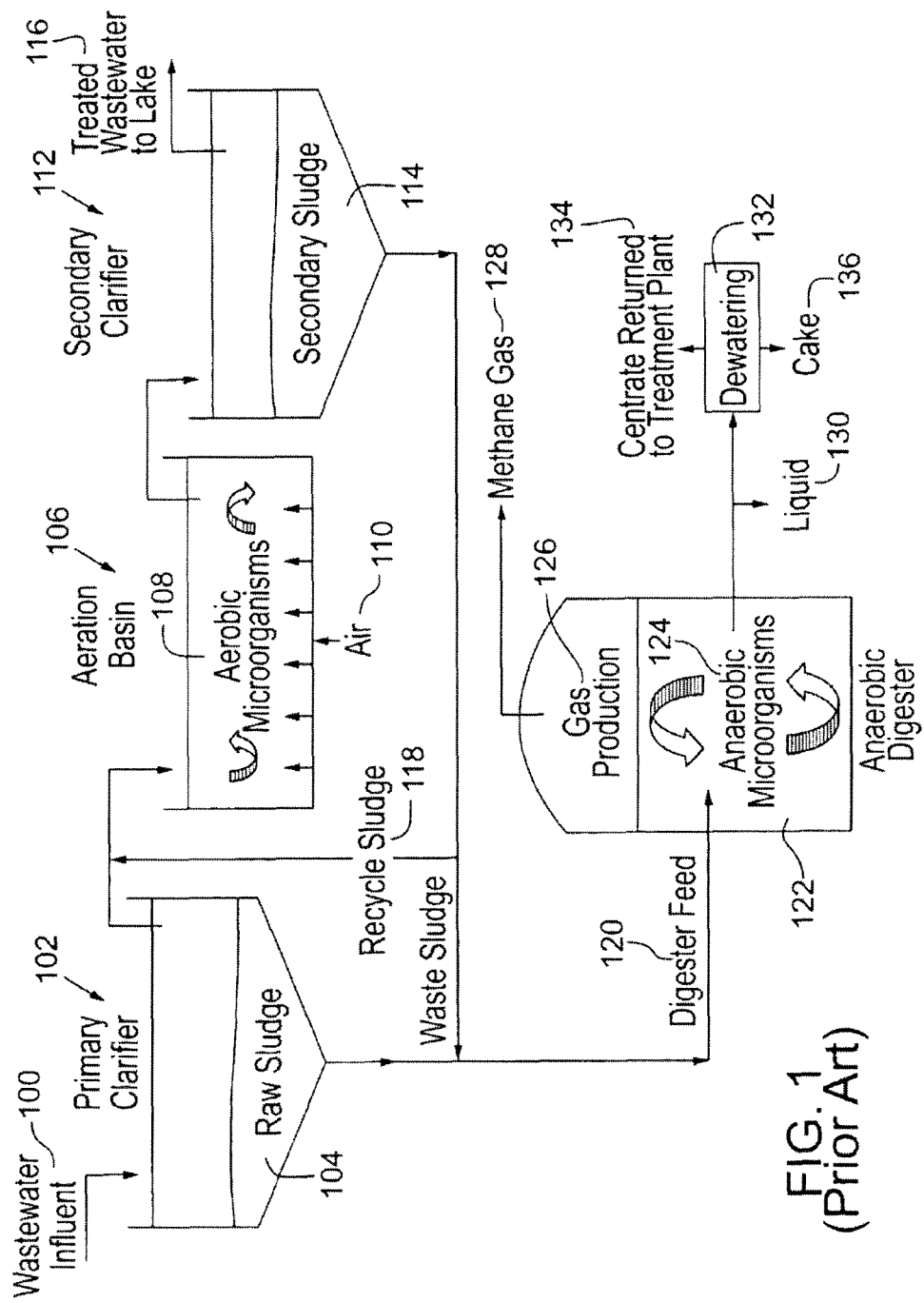
FIG. 1 is a schematic diagram illustrating components of a wastewater treatment facility in accordance with the prior art.
Figure 3A:
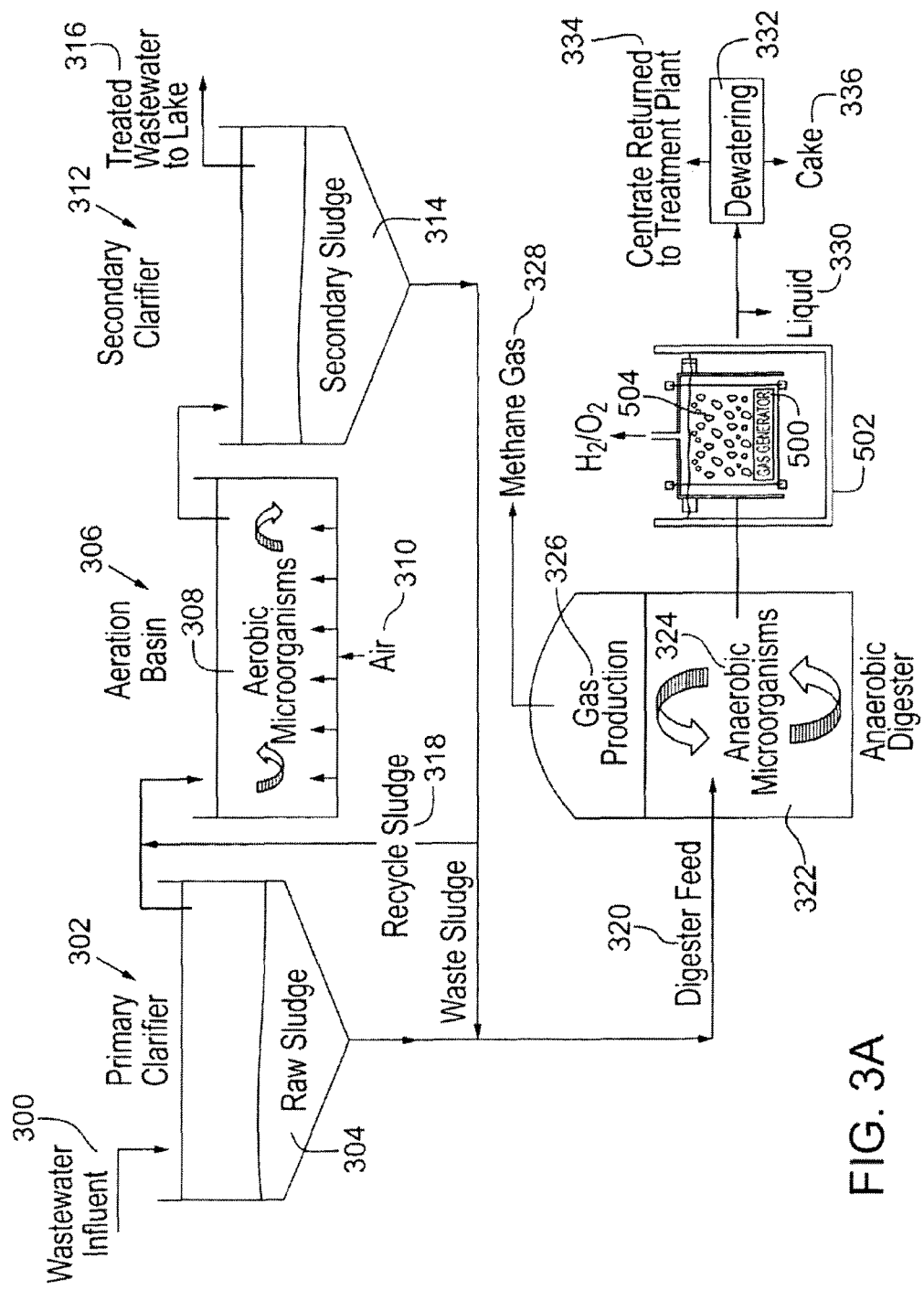
FIG. 3A is a schematic diagram illustrating a wastewater treatment facility in which an oxyhydrogen gas generation apparatus is incorporated between an anaerobic digester of the facility and a dewatering process for performing conditioning and/or flocculation unit processes.
Figure 3B:
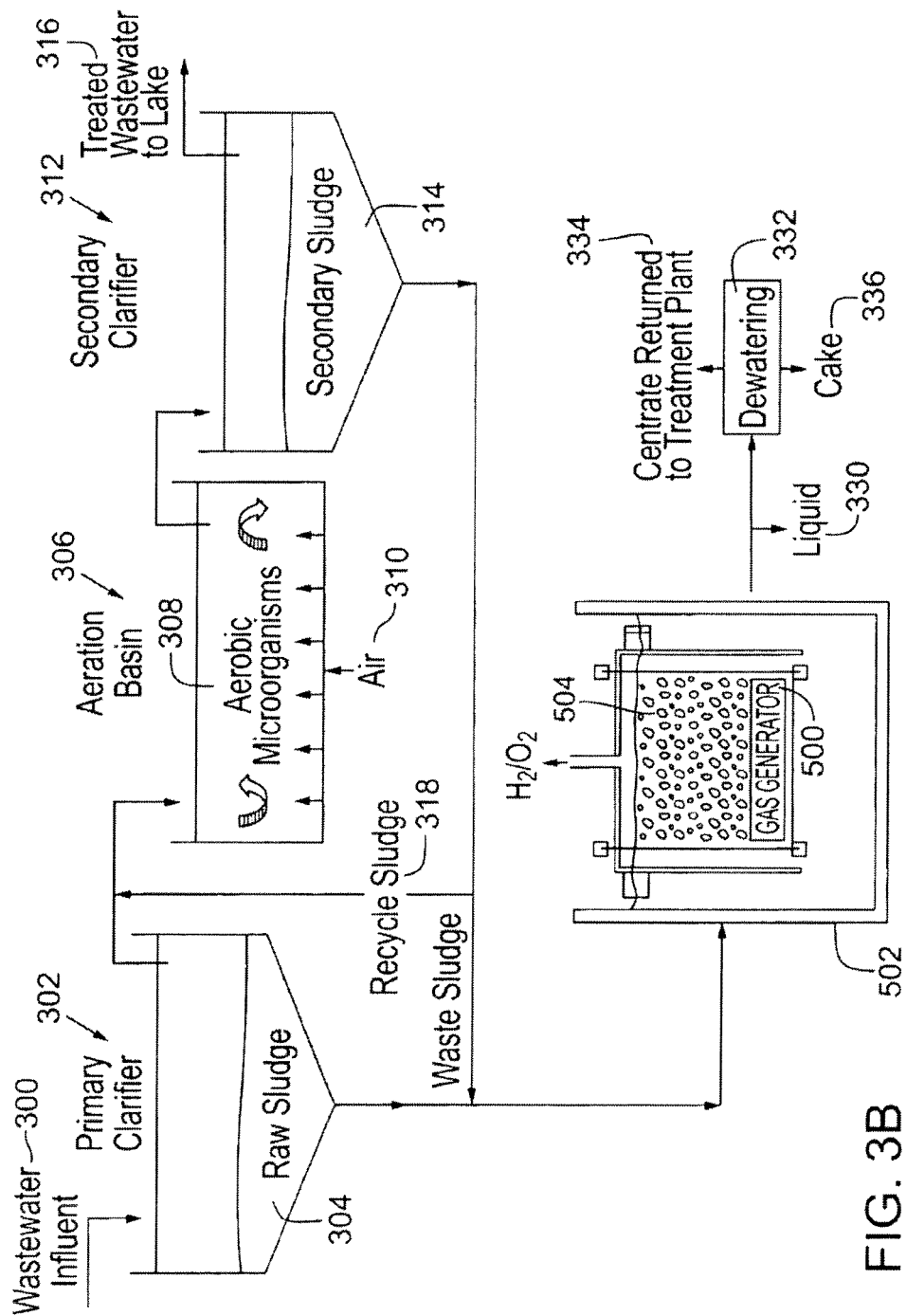
FIG. 3B is a schematic diagram illustrating a wastewater treatment facility utilizing an oxyhydrogen gas generation apparatus in lieu of an anaerobic digester for performing a stabilization unit process.
Figure 3C:
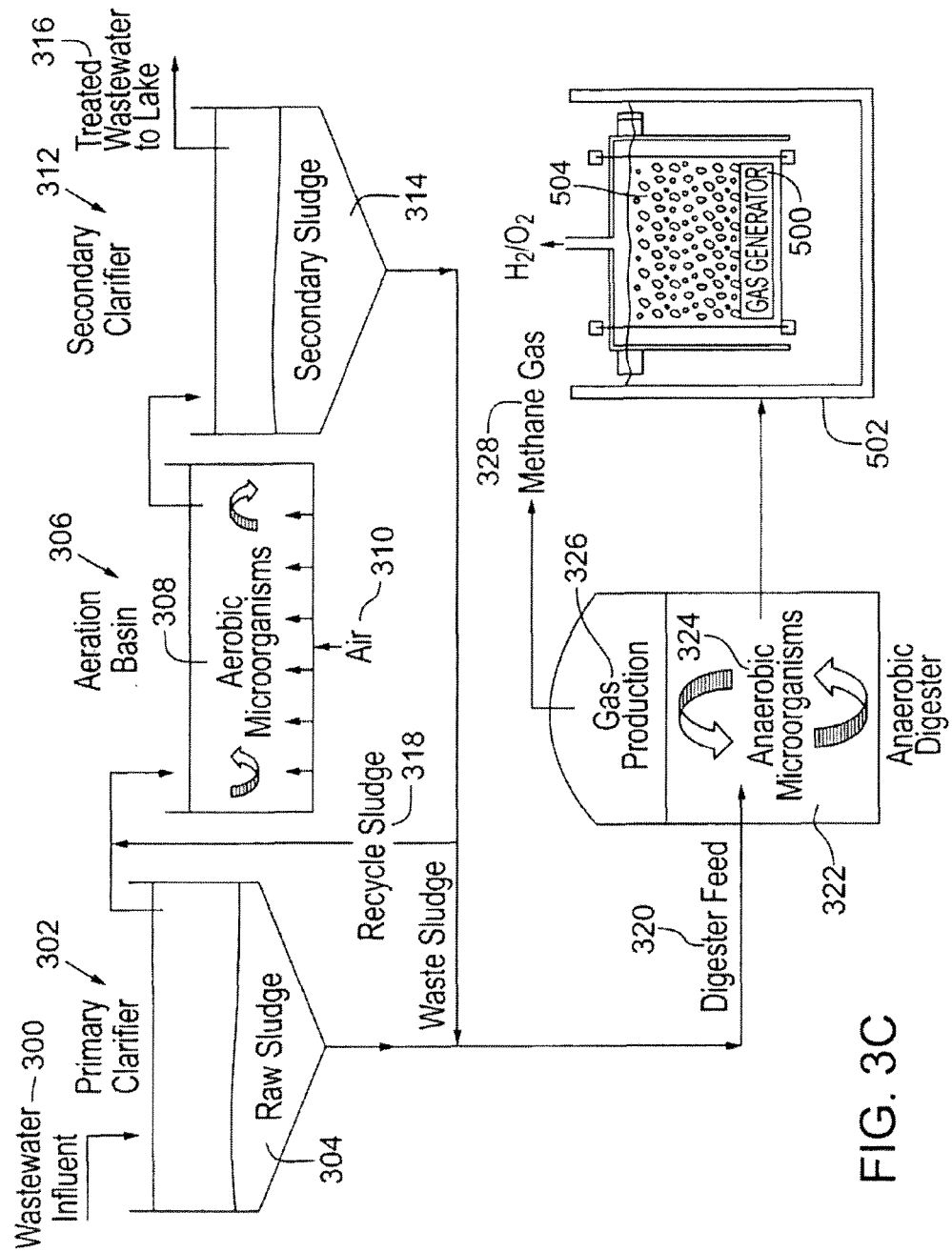
FIG. 3C is a schematic diagram illustrating a wastewater treatment facility utilizing an oxyhydrogen gas generation apparatus for dewatering preliminary to an incineration unit process.

FIGS. 3A-3C represent further illustrative embodiments of wastewater treatment facilities including oxyhydrogen gas generators 500 for processing waste streams including biosolids. With respect to FIGS. 3A-3C, reference numerals in the 300-series correlate to 100-series numerals in the corresponding FIG. 1, described above. For example, in FIGS. 3A-3C the primary clarifier is represented by reference numeral 302, which corresponds to reference numeral 102 for the corresponding unit process of FIG. 1. Details in FIGS. 3A-3C numbered with 500-series reference numerals are described below in greater detail with reference to FIG. 5. With respect to FIG. 3A, a gas generator 500 is illustrated in operation between the anaerobic digester 322 and the dewatering process 332 for performing conditioning and/or flocculation unit processes. In FIG. 3B, the gas generator 500 is operated in lieu of an anaerobic digester (122 from FIG. 1) for purposes of stabilization of the waste stream. In the embodiment of FIG. 3B, the gas generator 500 may also function as a conditioning unit process or a combined stabilization/conditioning unit process, depending on the nature of the waste stream entering reaction vessel 502. In FIG. 3C, the gas generator 500 is operated in lieu of a conventional dewatering process (132 from FIG. 1) as part of a combined dewatering and incineration procedure consistent with the embodiments described.

Figure 5:
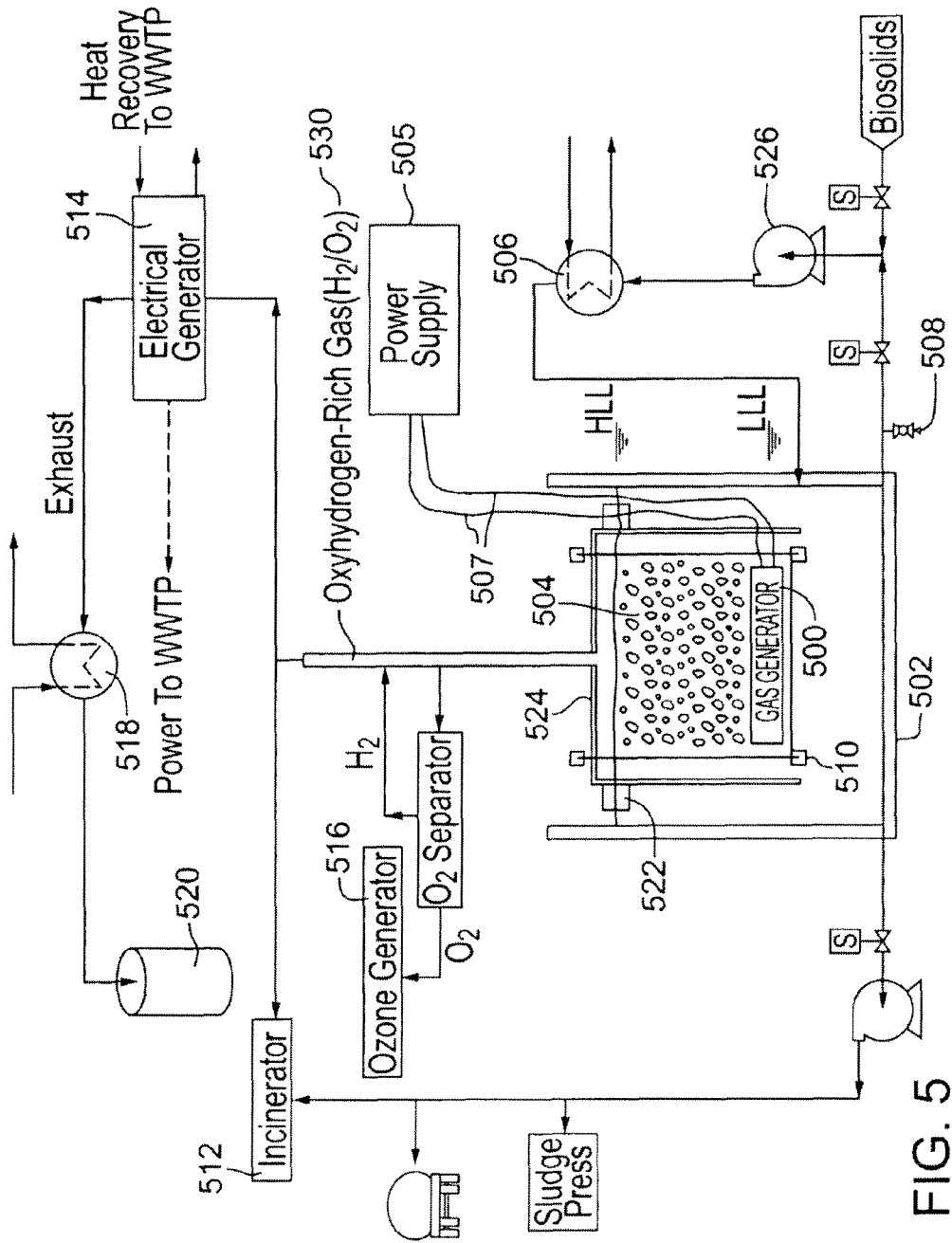
FIG. 5 is a schematic diagram illustrating an apparatus consistent with the various embodiments and displaying its application in the treatment of wastewater biosolids in a wastewater treatment facility, as in the embodiments of FIGS. 3A, 3B, and 3C, for example.

Embodiments applied to the treatment of wastewater biosolids are schematically illustrated in further detail in FIG. 5. FIG. 5 represents one embodiment of the oxyhydrogen gas generators GG2-GG5 of FIG. 2, and, more specifically, provides additional detail of the implementation of gas generators 500 of FIGS. 3A-3C. With reference to FIG. 5, gas generator 500 is submerged in a reaction vessel 502 containing a fluid suspension 504 including water and biosolids. Fluid suspension 504 may be dilute, as in influent wastewater, or may be more concentrated, as in activated waste sludge, raw sludge, or thickened sludge. Fluid suspension 504 typically includes a substantial portion of biological flocs (biosolids) having an aggregate specific gravity of only slightly greater than 1.0.

Gas generator 500 may be mounted on a frame 510 that is hung from a set of floats 522 so that the submergence of the gas generator 500 is maintained at a desired level below the surface of the fluid 504. Alternatively, gas generator 500 may be mounted on a fixed lid or other fixed support for positioning at a fixed height in reaction vessel 502. In the embodiment shown in FIG. 5, floats 522 may also serve to seal the top of reaction vessel 502. The frame 510 is adjustable so that the submergence level of the gas generator 500 can be adjusted independent of the depth of fluid 504 in the reaction vessel 502.

In another embodiment, gas generator 500 is placed on a pedestal or other support so that it is positioned below the middle of the depth of fluid 504 in the reaction vessel 502. Placement of gas generator 500 low in the reaction vessel (or other reaction zone) increases the distance that bubbles of oxyhydrogen-rich gas must rise through fluid 504, thus increasing their residence time and probability of contacting a biosolids particle or other treatable molecule. Preferably, gas generator 500 is positioned at least slightly above the floor of the reaction vessel 502 to avoid buildup of sediment and sludge between the electrodes of the gas generator 500.

Gas generator 500 includes a series of closely-spaced electrode plates that are oriented generally vertically and arranged such that the spaces between adjacent plates are open to the reactor contents at both the top and bottom edges of the plates. A pulsed electrical signal from a power source 505 is provided to the electrode plates via power transmission wires 507. The application of the pulsed electrical signal causes water molecules in the fluid suspension 504 to be dissociated in an interaction zone extending between the plates and slightly beyond the openings between the plates, to thereby form an oxyhydrogen-rich gas including hydrogen and oxygen. The oxyhydrogen-rich gas collects in the interaction zone to form bubbles that rise through the fluid suspension 504 between the plates and can then be collected at the surface of the fluid suspension 504 under a gas containment lid 524. Because the aggregate density (specific gravity) of biological flocs in the fluid suspension 504 is only marginally greater than 1.0, the rising bubbles may transport the flocs upward and into contact with the oxygen and hydrogen in the liberated gas bubbles and/or the atmosphere collected under the containment lid 524.

In the process of generating oxyhydrogen-rich gas, heat is generated around the gas generator 500 and the temperature of the fluid suspension 504 in the reaction vessel 502 may increase. A portion of the contents of the reaction vessel 502 may be withdrawn on a continual and variable basis and recirculated through a heat exchanger 506 via a feed/recirculation pump 526 to maintain the temperature of the fluid suspension 504 at a desired level for the specific application in question. In addition to providing temperature control, the recirculation loop may also provide a degree of positive mixing in the reaction vessel 502 to help keep the bio solids in suspension and thus in a position to be transported upwards toward the surface of the fluid suspension 504 or another contact zone where the biosolids are more likely to contact oxyhydrogen-rich gas. Sample ports 508 may be provided in the recirculation line to allow samples of the biosolids to be collected and analyzed for various parameters in order to determine the degree of treatment that has been achieved at any point in time.

Unit process applications for gas generator 500 in the context of municipal or industrial wastewater treatment may include disinfection, thickening, conditioning, dewatering, and stabilization, for example, as described herein. The combination of operating parameter levels can be optimized for each kind of unit process and may be unique for each application and for each waste stream source. Some of the operating parameters, which can be independently varied, include the submergence depth of the gas generator 500, the magnitude of the power provided to gas generator 500 via power supply 505, the characteristics of the pulsed electrical signal to the electrodes of the gas generator 500, and the temperature and the residence time of the fluid suspension 504 within the reaction vessel 502. Characteristics of the pulsed electrical signal that may be controlled by power supply 505 include pulse frequency, amplitude, pulse duration, mark:space ratio, waveform (i.e., square wave, saw tooth wave, etc.), and voltage relative to ground. Other applications and corresponding operating parameters may also be evident to those skilled in the art.

Conditioning destroys or degrades the natural polysaccharide layers that are present on the surface of biological flocs and act as a deterrent to dewatering. As the flocs are drawn upwards by the rising bubbles of oxyhydrogen-rich gas, they are brought into direct contact with the hydrogen and/or oxygen in bubbles produced by the gas generator in a highly-oxidative contact zone. Because the polysaccharide layers represent the outermost boundary of the floc particles, these layers will be preferentially degraded. This removal of a substantial fraction of the polysaccharide layer has the effect of reducing or completely eliminating the need for polymer addition in subsequent conventional dewatering processes. As shown in FIGS. 3, 3A, and 3B, the conditioned biosolids can be transported directly to a conventional dewatering device and the dewatered cake can be disposed of or utilized in any conventional manner known in the art.

The application of embodiments to dewatering is different from the conventional concept of dewatering. In conventional dewatering, the objective is to achieve a minimum cake solids concentration of approximately 20% to 30% depending on the type of biosolids and the downstream processing requirements. Current incineration methods require that biosolids be dewatered to about 20%-30% solids, because at these concentrations there is sufficient energy in the cake to vaporize the liquid portion without the addition of auxiliary fuel. In the embodiment of FIG. 5, the final solids concentration of the biosolids released to incinerator 512 is relatively unimportant because the incineration process 512 includes combustion of the biosolids particles and vaporization of the remaining free water. As electrical power is provided to the gas generator 500, water from the reaction vessel is liberated into oxyhydrogen-rich gas and the degree of dewatering achieved will be in direct proportion to the amount of oxyhydrogen gas produced. In this approach the amount of gas produced is more important than the final solids concentration in the reaction vessel 502. It is expected that only a small fraction of water need be converted to gas to provide sufficient energy to incinerate the remaining contents of the reactor.

In one embodiment, the generation of a sufficient amount of oxyhydrogen gas via gas generator 500 is expected to cause a corresponding 10% increase in the solids concentration, from approximately 3.0% solids to approximately 3.3% solids, for example. In other embodiments, the solids concentration may be increased to approximately 10% or 20% solids concentration before incineration using oxyhydrogen gas. Because the fuel for the incineration process 512 (i.e., the oxyhydrogen gas) can be generated internally, the demand for imported fuel can be reduced or eliminated. Biosolids are also incinerated in the form of a liquid suspension, rather than cake form, which may eliminate the need for conventional dewatering as a pre-processing step and the attendant material handling problems associated with the transfer of a semi-solid or plastic cake to the incinerator 512. The ability to incinerate biosolids in the form of a liquid suspension also offers the potential for using non-conventional incinerator technology, which in turn may reduce the costs such that incineration becomes economically attractive for use at smaller installations. Incineration may also eliminate the need and the cost for both stabilization and conventional dewatering, which may make the incineration of liquid biosolids economically competitive with other management alternatives.

Regardless of the unit process performed by a particular embodiment, an energy-rich gas will be produced. As shown in FIG. 5, this gas can be used as fuel for incineration 512, power generation 514, or as a feed source for the production of ozone 516 (with oxygen separated from the gas mixture).

FIG. 4 is a schematic diagram illustrating several secondary uses for oxyhydrogen-rich gas (e.g., 220, 262, 272, 278) produced by one or more unit processes employing oxyhydrogen gas generators in accordance with FIGS. 2, 3A, 3B, 3C and/or 5. As indicated in FIG. 4, oxyhydrogen-rich gas may be used as a fuel for (A) incineration of sludge or biosolids, (B) power generation (and subsequent heat recovery for in-plant use), and (C) hot gas generation (for drying or other hot processing). Oxyhydrogen-rich gas may also be separated into its hydrogen and oxygen components for use in one or more secondary processes or uses (D). For example, an oxygen component of the oxyhydrogen-rich gas may be supplied to an ozone generator of a disinfection process or pumped into an aeration basin. When oxygen is separated from oxyhydrogen-rich gas, the hydrogen component can be conveyed to a different secondary use, such as combustion for incineration, power generation, or drying, for example.

One of the most critical unit processes in wastewater treatment consists of the oxidation of organic matter by aerobic bacteria. Oxygen is supplied to these bacteria by compressors that inject pressurized air into the aeration basin. The availability of electrical power for pumping air into the aeration basin is a necessity. The compressors have large motors that require substantial electrical power to operate, and, in general, they account for 20% to 30% of the total energy requirement of the liquid portion of a water treatment plant. Accordingly, it is of tremendous benefit to have a power source integral to the treatment process. The availability of an energy-rich gas such as that produced by gas generator 500, which may be used to generate electricity on site, allows the facility to control power costs and ensures that an adequate supply of power is available.

The gas produced by embodiments of the present invention is an oxyhydrogen-rich gas that can be combusted with minimal greenhouse gases as by-products. The gas does not require extensive cleaning and the quantity of gas produced can be adjusted to match the demand for power. The production of power within the treatment plant utilizing the produced gas will result in long-term lower electrical costs and provide a secure supply of electricity that is independent of external market conditions.

The principal products of combustion of oxyhydrogen gas are heat and water vapor. When oxyhydrogen-rich gas is combusted for drying, power generation, or other purposes, the hot combustion exhaust may be condensed in a condensing process 518 to recover high-quality water that can be stored 520 for use within the wastewater treatment facility for a variety of uses. However, apart from drinking water, many of these uses do not require potable water quality but they do require a higher quality than is available as secondary effluent. Examples of these uses would include flushing of toilets and urinals, dilution water for polymer solutions and preparing other chemical solutions. Thus, water condensed 518 from combustion exhaust can replace water otherwise purchased from a municipal water supply for uses where potable water is not a requirement, thereby reducing operating costs.

It has now been determined that the systems and methods for removing contaminants from a waste stream can also be used to reduce the concentration of pharmaceuticals, personal care products and petrochemical products in the waste stream. Independent testing has now confirmed that the systems and methods can reduce redox active contaminant concentrations from wastewater at an unexpectedly high level and to an extent that treated effluents can be reused in the process. Table 1, below, lists pharmaceuticals, personal care products and petrochemical products, as well as other redox active contaminants, which were detected in municipal waste water prior to treatment and their corresponding concentrations after treatment of the waste water. The general use of a pharmaceutical is also noted. The systems and methods for removing contaminants from a waste stream may also remove other pharmaceutical, personal care products and petrochemical products, such as Fluoxetine, Sulfamethazine, Indomethacin, Gemfibrozil and Estrone, which are not listed below.

TABLE 1

LIST OF CONTAMINANTS

| Contaminant | General Use | Raw Waste Water | Waste Water after treatment | % Reduction |
|---|---|---|---|---|
| Acetaminophen | Analgesic/anti-inflammatory | 61 (µg/L) | <0.01 (µg/L) | 99.98 |
| Azithromycin | Antibiotic | 3.13 (µg/L) | <0.0005 (µg/L) | 99.98 |
| Benzafibrate | Lipid regulator | 0.288 (µg/L) | <0.0001 (µg/L) | 99.97 |
| Benzene | Organic solvent | 92.9 (mg/L) | <0.0005 (mg/L) | 100.00 |
| Caffeine | Stimulant | 37.1 (µg/L) | <0.0005 (µg/L) | 100.00 |
| Calcium | | 432 (mg/L) | 22.7 (mg/L) | 94.75 |
| Carbamazepine | Mood stabilizing drug | 3.19 (µg/L) | <0.0001 (µg/L) | 100.00 |
| Chloride | | 10600 (mg/L) | 29.5 (mg/L) | 99.72 |
| Ciprofloxacin | Antibiotic | 0.865 (µg/L) | 0.066 (µg/L) | 92.37 |
| Diclofenac | Anti-arthritic | 0.142 (µg/L) | <0.025 (µg/L) | 82.39 |
| Diphenylhydramine | Anti-histamine | 0.421 (µg/L) | 0.000169 (µg/L) | 99.96 |
| Erythromycin | Antibiotic | 0.168 (µg/L) | <0.001 (µg/L) | 99.40 |
| Ethyl Benzene | Organic solvent | 39.3 (mg/L) | <0.0005 (mg/L) | 100.00 |
| Hexone | Organic solvent | 117 (mg/L) | <0.02 (mg/L) | 99.98 |
| Ibuprofen | Analgesic/anti-inflammatory | 6.05 (µg/L) | <0.25 (µg/L) | 95.87 |
| Irgasan | Topical antibiotic | 3.38 (µg/L) | <0.1 (µg/L) | 97.04 |
| Magnesium | | 81.4 (mg/L) | 16.7 (mg/L) | 79.48 |
| Methanol | Organic solvent | 27800 (mg/L) | 28.7 (mg/L) | 99.90 |
| Miconazole | Anti fungal | 0.0515 (µg/L) | <0.0005 (µg/L) | 99.03 |
| Naproxen | Analgesic/anti-inflammatory | 3.91 (µg/L) | <0.0025 (µg/L) | 99.94 |
| Ofloxacin | Antibiotic | 1.16 (µg/L) | 0.0117 (µg/L) | 98.99 |
| Pentoxyfilline | | 0.0272 (µg/L) | <0.0001 (µg/L) | 99.63 |
| Sulfamethoxazole | Antibiotic | 0.204 (µg/L) | <0.0005 (µg/L) | 99.75 |
| Tetracycline | Antibiotic | 0.975 (µg/L) | <0.05 (µg/L) | 94.87 |
| Toluene | Organic solvent | 263 (mg/L) | <0.0005 (mg/L) | 100.00 |
| Triclocarban | Topical antibiotic | 0.317 (µg/L) | <0.01 (µg/L) | 96.85 |
| Trimethoprim | Antibiotic | 0.329 (µg/L) | <0.0001 (µg/L) | 99.97 |
| Xylenes | Organic solvent | 360 (mg/L) | <0.0015 (mg/L) | 100.00 |

Treatment of the raw waste water, generating the results shown in Table 1, was accomplished using a reactor with a set of stainless steel electrodes. As described below, the resulting effluent can optionally be further treated in an additional reactor having aluminum electrodes. The effluent from the reactor with aluminum electrodes can optionally be filtered through one or more activated carbon filters in order to further reduce the concentration of the redox active contaminants.

Tables 2 and 3 detail the results of the testing of municipal waste water from a different source than the waste water used in Table 1. In Table 2, "ND" is an abbreviation for "Not detected". Each sample was exposed to an initial treatment in a stainless steel reactor for a time of approximately 10 minutes, a second treatment in an aluminum reactor for a time of approximately 2 minutes, and finally effluents were polished by granular activated carbon column.

TABLE 2

Determination of pharmaceutical residues found in water (µg/L)

| | Raw Waste Water | After treatment with Stainless Steel Electrode | After treatment with Aluminum Electrode | After polishing with activated carbon - Analysis #1 | After polishing with activated carbon - Analysis #2 |
|---|---|---|---|---|---|
| Benzafibrate | 0.0356 | ND | | ND | ND |
| Caffeine | 12.8 | 0.00479 | 0.00897 | 0.00678 | 0.00579 |
| Carbamazepine | 0.166 | ND | ND | ND | ND |
| Fluoxetine | 0.0315 | ND | ND | ND | ND |
| Sulfamethazine | ND | ND | ND | ND | ND |
| Sulfamethoxazole | 1.58 | ND | ND | ND | ND |
| Trimethoprim | 0.635 | ND | ND | ND | ND |
| Estrone | ND | ND | ND | ND | ND |
| Indomethacin | ND | ND | ND | ND | ND |
| Ibuprofen | 17.6 | 1.31 | 1.1 | ND | ND |
| Naproxen | 12.4 | 0.0926 | 0.0552 | ND | ND |
| Diclofenac | 0.103 | ND | ND | ND | ND |
| Gemfibrozil | ND | ND | ND | ND | ND |

As the waste waters used to obtain the results shown in Tables 1 and 2 were different, the characteristics of the different components (other than the pharmaceutical and personal care products) could have contributed to variations in oxidation of organic material in the two waste waters. Further, in Table 2, an increase in caffeine that is shown after treatment with the aluminum electrodes could be an anomaly or could be related to chemical reactions. In any event, the difference does not appear to be statistically relevant.

In Table 3, the quality assurance (QA) samples follow the amounts detected in the waste water pre- and post-treatment. CVS is an abbreviation for Calibration Verification Standard used to determine whether the calibration curve is correct. LCS means Laboratory Control Sample. The LCS is a "sample" (always a clean water or solid) that is spiked with the contaminant, to determine the efficiency of the extraction process and detection. MS refers to the Matrix Spike, which is an actual sample that is spiked as an LCS, but this verifies that the contaminant can be extracted and detected in an actual sample or slightly different matrix than the MS. The $R^2$ refers to the recovery of the contaminant from the sample. Finally, RL shows the reporting limits. These results show the lowest limit that may be detected within the confidence level. The provided confidence levels range from 95% to 99.5%.

TABLE 3

QA Samples

|  | CVS | LCS | MS | $R^2$ | Reporting Limits |
|---|---|---|---|---|---|
| Benzafibrate | 97.80% | 95.60% | 79.10% | 0.9999 | 0.005 |
| Caffeine | 100% | 96.80% | 110% | 0.9999 | 0.005 |
| Carbamazepine | 104% | 97.60% | 82.10% | 0.9999 | 0.005 |
| Fluoxetine | 103% | 95.20% | 102% | 1 | 0.005 |
| Sulfamethazine | 101% | 94.10% | 100% | 1 | 0.005 |
| Sulfamethoxazole | 103% | 94.80% | 99.50% | 0.9999 | 0.005 |
| Trimethoprim | 97.70% | 93.20% | 100% | 0.9995 | 0.005 |
| Estrone | 93.40% | 99.80% | 101% | 0.9991 | 0.05 |
| Indomethacin | 100% | 79.80% | 80.70% | 0.9999 | 0.005 |
| Ibuprofen | 102% | 98.80% | 93.00% | 0.9999 | 0.02 |
| Naproxen | 102% | 76.20% | 91.30% | 0.9999 | 0.05 |
| Diclofenac | 98.30% | 102% | 94.00% | 1 | 0.02 |
| Gemfibrozil | 104% | 94.00% | 95.40% | 0.9999 | 0.02 |

As can be seen from these test results, the systems and methods reduce the concentration of organic contaminants, such as pharmaceuticals, personal care products and petrochemical products, in the waste stream. This feature may be advantageous in treating municipal waste water where these contaminants may be incorporated within the waste water but where traditional treatment processes may not eliminate them. At present, the steel electrodes appear to be effective at reducing the concentrations. In the experiments, the addition of a set of aluminum electrodes adds to the reduction. It will be understood that other metals and or combinations of metals used in the electrodes and in a different order may have the same or improved results depending on the target contaminants.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for removing a pharmaceutical from a waste stream, comprising:
    submersing two electrodes in the waste stream, the waste stream comprising a water component and the pharmaceutical, the electrodes bordering an interaction zone extending therebetween;
    applying a pulsed electrical signal to at least one of the electrodes thereby generating oxyhydrogen gas from the water component,
    the oxyhydrogen gas forming bubbles in the interaction zone that rise to a surface of the waste stream, wherein at least some of the bubbles contact the pharmaceutical as they rise through the waste stream;
    oxidizing the pharmaceutical with an oxidant contained in the oxyhydrogen gas; and
    transporting at least a portion of the treated pharmaceutical to the surface of the waste stream with the bubbles that contact the pharmaceutical.

2. The method of claim 1 wherein the pharmaceutical is selected from the group consisting of: benzafibrate, carbamazepine, fluozetine, sulfamethoxazole, trimethoprim, ibuprofen, naproxen and diclofenac.

3. The method of claim 1, wherein the two electrodes comprise steel electrodes and wherein the method further comprises:
    submersing two aluminum electrodes in the waste stream downstream of the steel electrodes, the aluminum electrodes bordering a second interaction zone extending therebetween; and
    applying a pulsed electrical signal to at least one of the aluminum electrodes thereby generating oxyhydrogen gas from the water component, the oxyhydrogen gas forming bubbles in the second interaction zone that rise to a surface of the waste stream.

4. The method of claim 3, wherein the two aluminum electrodes are spaced 1 mm or less apart.

5. The method of claim 3, wherein the two aluminum electrodes are spaced about 1 mm to about 5 mm apart.

6. The method of claim 3, wherein the two aluminum electrodes are spaced about 5 mm or more apart.

7. The method of claim 1, wherein the pulsed electrical signal has a mark-space ratio of between about 1:1 and about 10:1 and a pulse frequency of between about 10 to about 250 kHz.

8. The method of claim 1, wherein the two electrodes are spaced 1 mm or less apart.

9. The method of claim 1, wherein the two electrodes are spaced about 1 mm to about 5 mm apart.

10. The method of claim 1, wherein the two electrodes are spaced about 5 mm or more apart.

* * * * *